United States Patent [19]

Gilst

[11] 4,176,869

[45] Dec. 4, 1979

[54] GATE LATCHING APPARATUS FOR ANIMAL CLOSURE PANELS

[75] Inventor: Carl V. Gilst, Goshen, Ind.

[73] Assignee: Ag Best Corporation, Goshen, Ind.

[21] Appl. No.: 762,516

[22] Filed: Jan. 26, 1977

[51] Int. Cl.² .......... E05C 13/02

[52] U.S. Cl. .......... 292/304; 292/67; 292/6

[58] Field of Search .......... 292/300, 302, 303, 5, 292/6, 67

[56] References Cited

U.S. PATENT DOCUMENTS

| | | | |
|---|---|---|---|
| 2,648,092 | 8/1953 | Esslinger | 16/147 |
| 3,030,717 | 4/1962 | Lewis | 16/147 X |
| 3,488,795 | 1/1970 | Marguelisch | 16/147 |
| 3,572,821 | 3/1971 | Van Antwerp | 16/147 X |
| 3,767,167 | 10/1973 | Rasmussen | 292/300 |

*Primary Examiner*—Richard E. Moore
*Attorney, Agent, or Firm*—Craig and Antonelli

[57] ABSTRACT

Gate latching apparatus is provided for detachably hingedly connecting an end of a tubular animal closure panel member to a relatively fixed support post or the support structure. The panel member includes downwardly protruding hinge pin members at the upper and lower portions thereof which engage in loop brackets provided at the top and bottom of the fixed support structure. To hold the panel member in position, a locking member in the form of a rectangular shaped closed loop is provided which has one side serving as a handle to be operated manually and the other side connected to and guided on a bolt. A spring surrounds the bolt and biases the locking member toward the fixed support structure. The locking member is axially movable and rotatable on the bolt member against the force of the spring between a locking position extending vertically and an unlocking position extending transversely to the vertical. The fixed support structure includes a U-shaped channel for rotatably locking the locking member when in the locking position. When in the unlocking position, the spring member around the bolt biases the locking member against the channel member so as to hold the same in the unlocking position. No separate tools and no separate parts other than those continuously carried at the support structure for the panel member are required for connecting and disconnecting the hingedly mounted panel members.

25 Claims, 4 Drawing Figures

GATE LATCHING APPARATUS FOR ANIMAL CLOSURE PANELS

BACKGROUND AND SUMMARY OF THE INVENTION

The present invention relates to apparatus for forming animal closures, particularly pig pens for pigs. Pig feeding and raising enterprises oftentimes require a large number of separate pens for accommodating different groups of pigs of different sizes. Also, to accommodate sorting of pigs and separating of a number of the pigs in a given pen and moving them to another pen, it is desirable to have closure panel members for the pens formed as hingedly mounted gates, so that one can easily open and close the same. It oftentimes becomes desirable to have an arrangement wherein one can change the size of the pens and wherein one can hingedly swing the panel members about either of the opposite ends thereof.

It has been contemplated for pig pens of the above-discussed type, to provide panel members that are hingedly mounted at both ends thereof at adjacent support structures such as brackets on fixed walls or posts. It has also been contemplated to provide such closure members with gate latch attachments which accommodate disconnection of either end of the panel member so as to accommodate swinging movement about the other end. However, many prior art arrangements have required either separate tools or other parts separate from the panel members and the support structure itself, which tools and separate parts are cumbersome to use and are subject to being lost or damaged during usage. Especially in many of the modern hog operations wherein manure pits are provided under slatted floors for the hogs, the dropping of any gate latch pin or gate latching and unlatching tool can raise serious problems, especially with a full or partially full manure pit.

The present invention contemplates a novel gate latching apparatus for hingedly mountable panel members which avoids the above-discussed problems, and which is economical to manufacture, sturdy in construction, and reliable and easy to operate.

According to the invention, a gate latching apparatus is provided which does not require any separate tools and which also does not require any parts separate from those carried at all times by one of the support structure and the panel member itself.

According to a preferred embodiment of the invention, the panel members are formed of tubular construction and include attachable panel member detent means formed as downwardly protruding hinge pins at the upper and lower sides of each of the opposite ends thereof. A fixed support structure, a fixed post, or a bracket fixed to a building wall structure or the like, is provided with attachable support structure detent means formed as loop brackets for hingedly accommodating the downwardly extending hinge pins. A locking member arrangement, attachable to one of the support structure and panel members, is provided or is movable between a locking position abutting against and locking the panel member against upward vertical movement and an unlocking position permitting free lifting and moving of the panel member. The locking member is provided as a rectangular loop-shaped member having one side serving as a handle and the other side thereof attached to the support structure by a bolt member having a spiral spring therearound. The spiral spring continuously biases the locking member toward the support structure so as to hold the same against the support structure in any set rotating position of the locking member. A channel member is provided at the support structure for rotatably locking the locking member in the locking position, a vertical position in preferred embodiments, with the underside of the locking member abuttingly engageable with the top of the panel member to hold the panel member against upward unlocking movement. To accommodate unlocking, one need merely pull the locking member horizontally in the direction of the axis of the bolt, a predetermined distance until the fixed channel member is cleared, then rotate the locking member to a horizontal position so as to free the panel member to be vertically moved. The panel member can then be lifted to disengage the hinge pins from the hinge loops. The spring surrounding the bolt assures that the locking member is also held in the unlocking position so that one need merely leave the locking member in the unlocking position until such time as one reinserts a gate or panel member in position, at which time the locking member can be simply manually rotatably moved to its locking position. Both the spring around the bolt and the channel member aid in holding the locking member in its locking position.

These and further objects, features and advantages of the present invention will become more apparent from the following description when taken in connection with the accompanying drawings which show, for purposes of illustration only, several embodiments in accordance with the present invention.

DETAILED DESCRIPTION OF THE DRAWINGS

Figure 1:
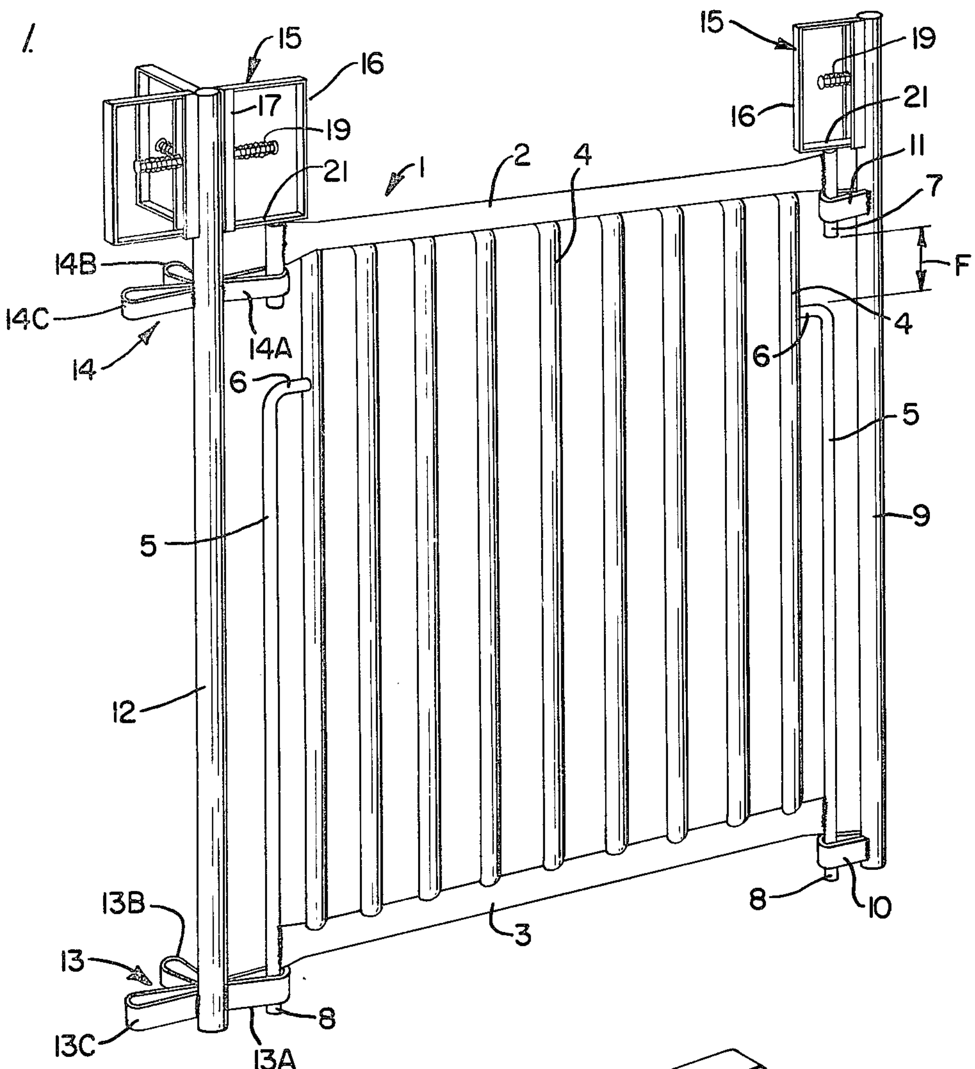
FIG. 1 is a perspective side view showing a panel member and gate latching apparatus constructed in accordance with the present invention.

Referring to the drawings, a panel member generally designated by the reference numeral 1 is provided which is made of tubular construction and includes an upper horizontal tube 2 and a lower horizontal tube member 3. Tube members 2 and 3 are attached to one another by a series of vertically extending tubes 4 secured thereto as, for example, by welding. At the respective opposite ends of the panel member 1, shortened bent over tubular members 5, having an horizontal offset section 6 are secured to the adjacent vertical tubes 4 and respective ends of the tube member 3 by, for example, welding. The horizontal sections 6 serve as convenient handles for the operator to grasp and manipulate the panel members 1 during hinged movement, as well as during latching and unlatching operations.

Each panel member 1 is provided with panel member detent arrangements which include upper hinge or detent pins 7 secured, for example, by welding, to the respective ends of the upper horizontal tube member 2, and lower or bottom hinge or detent pin members 8 formed as extensions of the tubular members 5. The hinge or detent pins 7, 8 are sufficiently short to accommodate lateral movement of the panel member 1 after being raised to a level where the top of the panel member 1 engages a locking member generally designated by the reference numeral 15, to be described more hereinafter when such locking member is in its unlocking position. The horizontal offset portion 6 of the bentover tubular members 5 are disposed at a distance F beneath the upper hinge pins 7.

A fixed support structure for the panel members is provided and may include, for example, support posts 9, 12, with each support post being provided with support structure detent arrangements which are lockingly engageable with the panel member detent arrangements when the panel member 1 and the support structure are in a predetermined connected position with one another with the panel member 1 hingedly carried by the support structure.

The support structure detent arrangement of the support post 9, at the right-hand side of FIG. 1, has fixedly attached thereto, for example, by welding, a single set of a lower loop bracket 10 and an upper loop bracket 11 for hingedly supporting the hinge pins 7, 8 at the support post 9.

The support structure detent arrangement of the support post 12, at the left-hand side of FIG. 1, has fixedly attached thereto, for example, by welding, a lower loop bracket generally designated by the reference numeral 13 and an upper loop bracket generally designated by the reference numeral 14.

The lower loop bracket 13 includes three radially outwardly extending loop brackets 13A, 13B, 13C arranged mutually perpendicular to one another with the upper loop bracket 14 having radially outwardly extending brackets 14A, 14B, 14C arranged mutually perpendicular to one another. The hinge pins 7, 8 at the left side of the panel member 1 are hingedly supported in the loops 13A, 14A.

Figure 2:
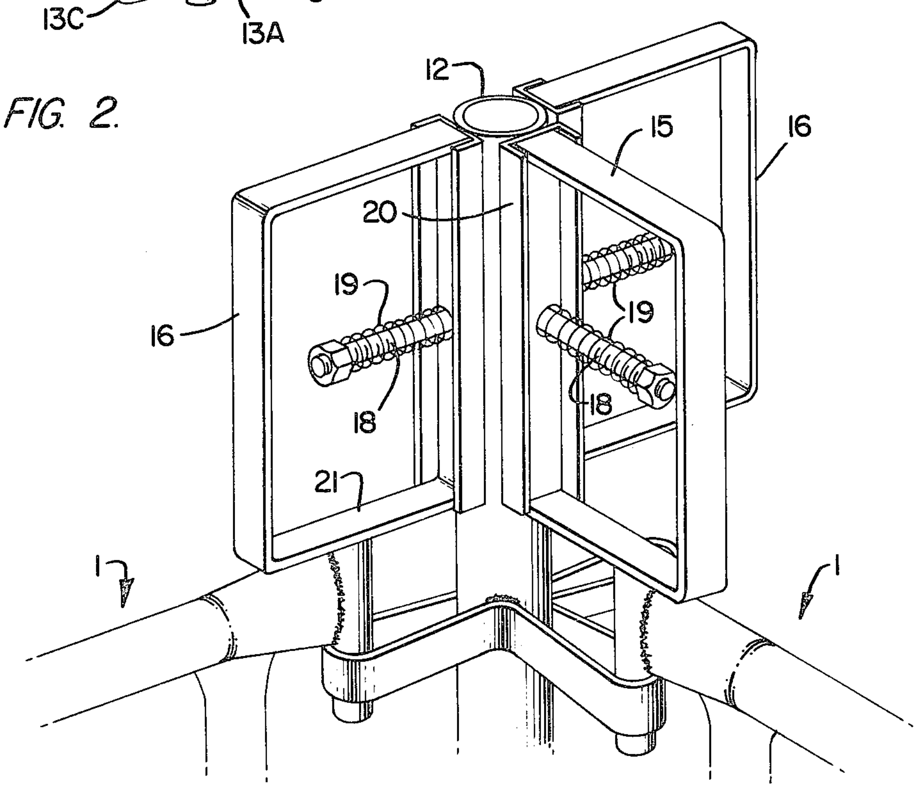
FIG. 2 is an enlarged perspective view showing a detailed latching apparatus of the present invention in a locked position.
Figure 3:
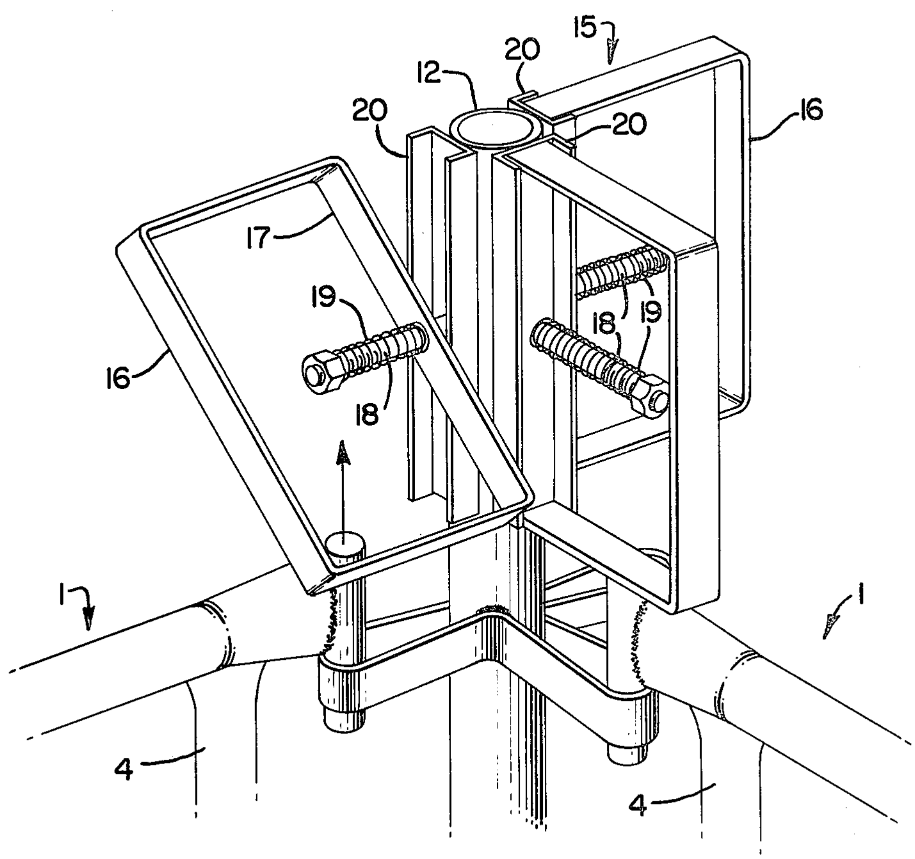
FIG. 3 is an enlarged perspective view of the latching apparatus of the present invention with a locking member in an unlocked position.

In order to prevent that the inadvertent vertical lifting of the panel members 1 upwardly and out of the hinge connection between the respective hinge pins and the hinge loops, locking members 15 are provided in the embodiment of FIGS. 1–3. Each locking member 15 is formed in the shape of a rectangle having, in the locked position of FIG. 2, one vertically extending side 16 serving as a manually grippable handle. The opposite side 17 of each locking member 15 is rotatably supported by a bolt 18 and a spiral spring 19 surrounding the bolt 18. The bolt 18 extends through the side 17 of the respective locking members 15 with a certain amount of play and is fixed in position with respect to the post 12. The spring 19 serves to continuously bias the side 17, and therewith the locking member 15 in the direction of the post 12. To maintain the locking member 15 in a locked position, a U-shaped channel member 20 is also provided for each locking member 15 with the legs or side walls of the channel member 20 serving to prevent rotational movement of the side members 17 when the locking member 15 is in the locked position shown in FIG. 2.

When in the locked position of FIG. 2, an horizontally extending lower bottom member 21 of the locking member 15 extends over and immediately above the top of a panel member 1 in the area of the hinge pins 7 and loops 11 and 14A, whereby the panel member 1 is prevented from being lifted vertically to disengage the hinge pins 7 from the hinge loops 11 and **14*a*. In this manner, the locking member 15 serves as a reliable, rugged clamp holding the panel member 1** in position.

When one desires to unlatch the locking members 15 so as to permit removal of a panel member 1 or opening of one end thereof and hinged movement of the panel member 1 about the other end thereof, as shown most clearly in FIG. 3, one need merely pull on the handle 16 in the axial direction of the bolt 18 until the side member 17 has cleared the legs or side walls of the U-shaped channel member 20 and rotate the locking member 15 about the axis of the bolt 18. To facilitate removal of the panel member 1 or prevent any obstructing of a pivoting movement of the panel member 1, the locking member 15 may be rotated until the side 16 extends transverse to the position shown in the drawing. In this position, the locking member 15 will be vertically spaced above the top of the panel member 1 a sufficient distance to accommodate lifting of the panel member and movement of the hinge pins 7, 8 out of the respective hinge loops 13A, 14A.

In the illustrated embodiments, the right-hand post 9 has an arrangement of only a single set of hinge loops and a single locking member 15, while the left-hand post 12, includes an arrangement of three hinge loops and three locking members 15. However, it will be understood that the present invention also contemplates arrangements with two or more, in fact, any number of hinge loops and associated locking members at support posts with the number of such arrangements being solely dependent upon the particular gating configuration options desired.

Since the locking member 15 is at all times maintained in position with an associated support member, and is also maintained in its set position, either in a locked position (FIG. 2) or an unlocked position (FIG. 3), there is no danger that the tools or parts will be dropped during gate closure and opening or gate removal. Also, in view of the relatively simple construction with tubular gate members 1 and a simple welded steel construction of the latching mechanisms and loop brackets, the latching apparatus of the present invention can be made in an economical manner so as to be very reliable and durable.

Figure 4:
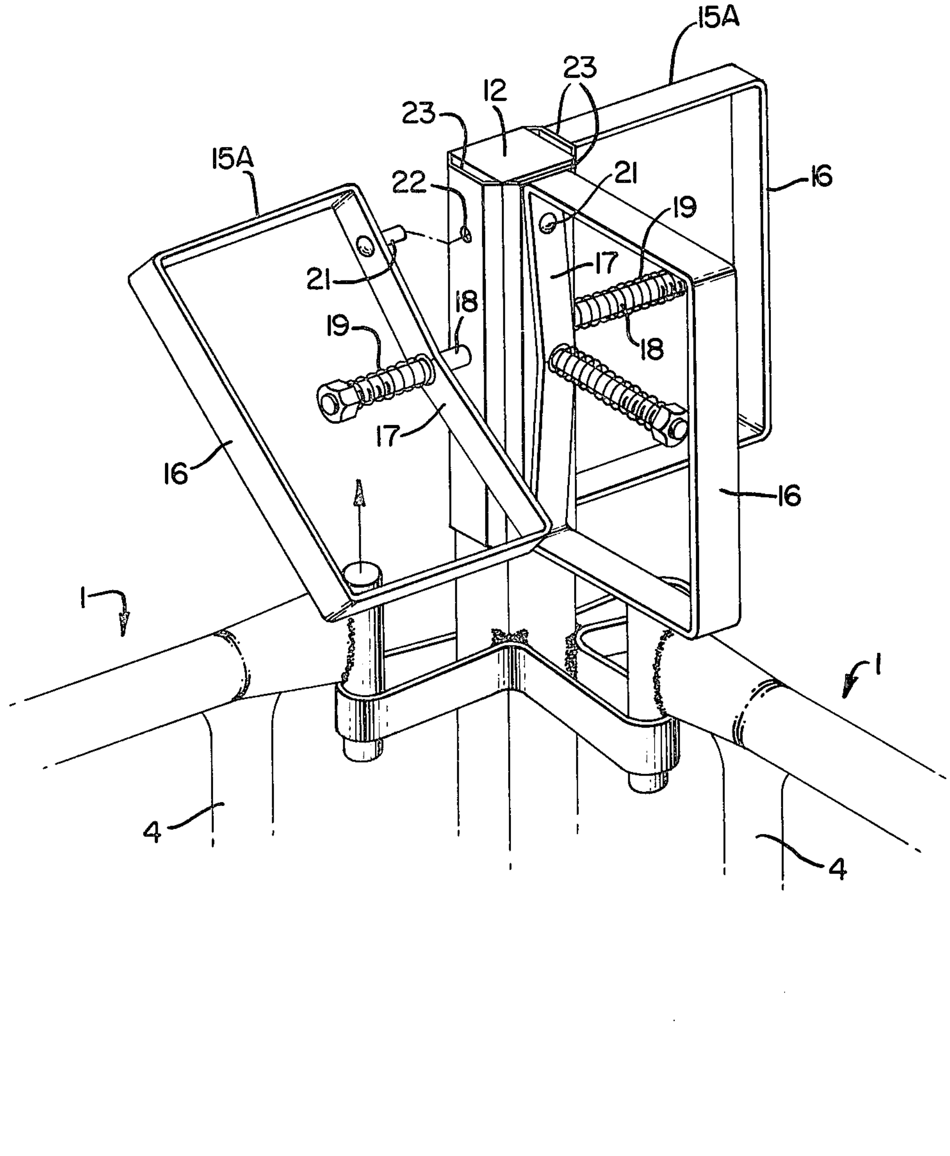
FIG. 4 is an enlarged partial perspective view of a modified embodiment of latching apparatus of the present invention.

FIG. 4 shows an alternative embodiment of locking member 15A and locking means for locking the locking member in the locked position. Like reference numerals are used in FIG. 4 to depict similar structure as in the embodiment of FIGS. 1–3. Locking member 15A differs from locking member 15 in that it includes a pin 21 fixed thereto, preferably by riveting or welding. Pin 21 is engageable in locking aperture 22 provided at the support post 12 to rotatably lock the locking member 15A in a respective locked position. Since pin 21 and aperture 22 serve to lock the member 15A in a locked position, the FIG. 4 embodiment can dispense with the U-shaped channel member 20. However, preferred embodiments include a shallow sloped wall channel member configuration of plate 23 in place of member 20, the sloped walls serving to align plate 23 with post 12 to which it is attached. It is to be understood that the arrangement of FIG. 4 operates in a manner similar to the embodiment of FIGS. 1–3, with only the means for maintaining the locking member in its locked position being different as described above.

While I have shown and described only one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. Apparatus for detachably hingedly connecting an end of an animal closure panel member with relatively fixed support structure; said apparatus comprising:

a panel member, panel member detent means attached to the panel member, relatively fixed support structure, support structure detent means attached to said relatively fixed support structure, said panel member detent means and said support structure detent means being lockingly engageable when said panel member and said support structure are in a predetermined connected position with one another with said panel member hingedly carried by said support structure for hinged movement about a vertical hinged axis, and a locking member which is attachable to one of said panel member and said support structure and which is manually movable between a locking position in engagement with the other of said panel member and said support structure to lock said panel member and such support structure in said connected position and an unlocking position permitting free manual movement of said panel member out of said connected position and away from said support stucture in a manner that an end of the panel member can be selectively manually hingedly connected to support structure and disconnected therefrom independently of any tools and with only parts continuously carried by said panel member and said support structure, wherein said panel member detent means and said support structure detent means are configured so that said panel member is hingedly vertically supported by said support structure independently of the position of said locking member.

2. Apparatus for detachably hingedly connecting an end of an animal closure panel member with relatively fixed support structure; said apparatus comprising:

panel member detent means attachable to a panel member, support structure detent means attachable to relatively fixed support structure, said panel member detent means and said support structure detent means being lockingly engageable when said panel member and said support structure are in a predetermined connected position with one another with said panel member hingedly carried by said support structure for hinged movement about a vertical hinged axis, and a locking member which is attachable to one of said panel member and said support structure and which is manually movable between a locking position in engagement with the other of said panel member and said support structure to lock said panel member and such support structure in said connected position and an structure detent means being lockingly engageable when said panel member and said support structure are in a predetermined connection position with one another with said panel member hingedly carried by said support structure for hinged movement about a vertical hinged axis, and a locking member which is attachable to one of said panel member and said support structure and which is manually movable between a locking position in engagement with the other of said panel member and said support structure to lock said panel member and such support structure in said connected position and an unlocking position permitting free manual movement of said panel member out of said connected position and away from said support structure, whereby an end of the panel member can be selectively manually hingedly connected to support structure and disconnected therefrom independently of any tools and with only parts continuously carried by said panel member and said support structure, wherein said panel member detent means and said support structure detent means are configured so that said panel member is hingedly vertically supported by said support structure independently of the position of said locking member, wherein said locking member is formed as a loop which exhibits first, second, and third sides, wherein said locking member is rotatably attachable to said one of said panel member and said support structure for rotatable movement between said respective locking and unlocking positions, unlocking position permitting free manual movement of said panel member out of said connected position and away from said support structure, whereby an end of the panel member can be selectively manually hingedly connected to support structure and disconnected therefrom independently of any tools and with only parts continuously carried by said panel member and said support structure, wherein said panel member detent means and said support structure detent means are configured so that said panel member is hingedly vertically supported by said support structure independently of the position of said locking member, wherein resilient means are provided for continuously forcing said locking member in a direction corresponding to both said locking and unlocking positions, said locking member being maintained in its set locking and unlocking position until manually moved therefrom against the force of the resilient means.

3. Apparatus for detachably hingedly connecting an end of an animal closure panel member with relatively fixed support structure; said apparatus comprising:

panel member detent means attachable to a panel member, support structure detent means attachable to relatively fixed support structure, said panel member detent means and said support structure detent means being lockingly engageable when said panel member and said support structure are in a predetermined connected position with one another with said panel member hingedly carried by said support structure, and a locking member which is attachable to one of said panel member and said support structure and which is manually movable between a locking position in engagement with the other of said panel member and said support structure to lock said panel member and such support structure in said connected position and an unlocking position permitting free manual movement of said panel member out of said connected position and away from said support structure, whereby an end of a panel member can be selectively manually hingedly connected to support structure and disconnected therefrom independently of any tools and with only parts continuously carried by said panel member and said support structure, wherein said locking member is carried by said support structure and is engageable against said panel member when in said locking position.

4. Apparatus according to claim 3, further comprising a panel member and support structure, wherein said panel member detent means, support structure detent means, and locking member are provided at each of the respective opposite ends of the panel member to accommodate selective connection of either or both ends of the panel member with the support structure.

5. Apparatus according to claim 4, wherein resilient means are provided for continuously forcing said locking member in a direction corresponding to both said locking and unlocking positions, said locking member being maintained in its set locking and unlocking position until manually moved therefrom against the force of the resilient means.

6. Apparatus according to claim 4, wherein said panel member detent means includes detent pins fixedly attached to upper and lower end parts of said panel member, and wherein said support structure detent means includes bracket loops fixedly attached to said support structure and having openings for hingedly accommodating said detent pins.

7. Apparatus according to claim 6, wherein said locking member is attached to said support structure by a bolt, and wherein a spring surrounds said bolt and continuously biases said locking member toward said support structure, said locking member being rotatably and axially movable with respect to the bolt.

8. Apparatus according to claim 7, wherein said locking member includes a channel member portion which is engagable in a corresponding shaped channel fixed to said support structure when in said locking position.

9. Apparatus according to claim 8, wherein said channel member portion is rotated about said bolt when said locking member is moved from said locking to said unlocking position.

10. Apparatus according to claim 9, wherein said locking member is formed as a closed loop, one side of said loop accommodating manual grasping of the locking member and the opposite side forming said channel member portion, said channel fixed to said support structure serving to rotatably fix said locking member when in said locking position.

11. Apparatus according to claim 10, wherein said channel extends vertically and wherein said channel member portion extends vertically when in said locking position and extends transversely to the vertical when in said unlocking position.

12. Apparatus according to claim 11, wherein said detent pins are sufficiently short to accommodate lateral movement of said panel member away from said support structure after being raised to a level where the top of the panel member engages said locking member in its unlocking position.

13. Apparatus according to claim 7, wherein said locking member includes a channel member portion carrying a locking pin fixed thereto, and wherein said locking pin is lockingly engageable in a locking aperture provided in said support structure when said channel member is in said locking position.

14. Apparatus according to claim 13, wherein said channel member portion is rotated about said bolt when said locking member is moved from said locking to said unlocking position.

15. Apparatus according to claim 14, wherein said locking member is formed as a closed loop, one side of said loop accommodating manual grasping of the locking member and the opposite side forming said channel member portion, said locking pin and locking aperture serving to rotatably fix said locking member when in said locking position.

16. Apparatus according to claim 15, wherein said channel member portion extends vertically when in said locking position and extends transversely to the vertical when in said unlocking position.

17. Apparatus according to claim 16, wherein said detent pins are sufficiently short to accommodate lateral movement of said panel member away from said support structure after being raised to a level where the top of the panel member engages said locking member in its unlocking position.

18. Apparatus for detachably hingedly connecting an end of an animal closure panel member with relatively fixed support structure; said apparatus comprising:

panel member detent means attachable to a panel member, support structure detent means attachable to relatively fixed support structure, said panel member detent means and said support wherein said first side of said loop accommodates manual grasping of the locking member, and wherein said second side of said loop includes a holding detent portion which is lockingly engageable with a corresponding holding detent portion on said one of said panel member and said support structure to rotatably hold said locking member in the locking position thereof.

19. Apparatus according to claim 18, wherein said third side of said loop is directly lockingly engageable with said other of said panel member and said support structure when said locking member is in its locking position.

20. Apparatus for detachably hingedly connecting an end of an animal closure panel member with relatively fixed support structure; said apparatus comprising:

panel member detent means attachable to a panel member, support structure detent means attachable to relatively fixed support structure, said panel member detent means and said support structure detent means being lockingly engageable when said panel member and said support structure are in a predetermined connection position with one another with said panel member hingedly carried by said support structure for hinged movement about a vertical hinged axis, and a locking member which is attachable to one of said panel member and said support structure and which is manually movable between a locking position in engagement with the other of said panel member and said support structure to lock said panel member and such support structure in said connected position and an unlocking position permitting free manual movement of said panel member out of said connected position and away from said support structure, whereby an end of the panel member can be selectively manually hingedly connected to support structure and disconnected therefrom independently of any tools and with only parts continuously carried by said panel member and said support structure, wherein said panel member detent means and said support structure detent means are configured so that said panel member is hingedly vertically supported by said support structure independently of the position of said locking member, wherein said locking member is rotatably connected to said one of said panel member and said support structure for rotation between said locking and unlocking positions about a rotation axis which extends transverse to the hinge axis.

21. Apparatus according to claim 6, wherein said locking member is formed as a loop which exhibits first, second, and third sides, wherein said locking member is rotatably attachable to said support structure for rotatable movement between said respective locking and unlocking positions, wherein said first side of said loop accommodates manual grasping of the locking member, and wherein said second side of said loop includes a holding detent portion which is lockingly engageable with a corresponding holding detent portion on said support structure to rotatably hold said locking member in the locking position thereof.

22. Apparatus according to claim 21, wherein said third side of said loop is directly unlockingly engageable with said panel member when said locking member is in its locking position.

23. Apparatus for detachably hingedly connecting an end of an animal closure panel member with relatively fixed support structure; said apparatus comprising:

panel member detent means attachable to a panel member, support structure detent means attachable to relatively fixed support structure, said panel member detent means and said support structure detent means being lockingly engageable when said panel member and said support structure are in a predetermined connected position with one another with said panel member hingedly carried by said support structure, and a locking member which is attachable to one of said panel member and said support structure and which is manually movable between a locking position in engagement with the other of said panel member and said support structure to lock said panel member and such support structure in said connected position and an unlocking position permitting free manual movement of said panel member out of said connected position and away from said support structure, whereby an end of a panel member can be selectively manually hingedly connected to support structure and disconnected therefrom independently of any tools and with only parts continuously carried by said panel member and said support structure, wherein said locking member is attached to one of said support structure and said panel wherein by a bolt, and wherein a spring surrounds said bolt and continuously biases said locking member toward said one of said support structure and said panel member, said locking member being rotatably and axially movable with respect to the bolt, said locking member being rotatably movable between its respective locking and unlocking positions.

24. Apparatus according to claim 23, wherein said locking member includes a holding detent portion which is lockingly engageable with a corresponding detent portion on said one of said support structure and said panel member when in said locking position.

25. Apparatus according to claim 24, wherein said holding detent portion on said locking member is a pin protruding parallel to and spaced from said bolt, and wherein said holding detent portion on said one of said support structure and said panel member is an aperture engageable with said pin.

* * * * *